United States Patent Office 3,071,185
Patented Jan. 1, 1963

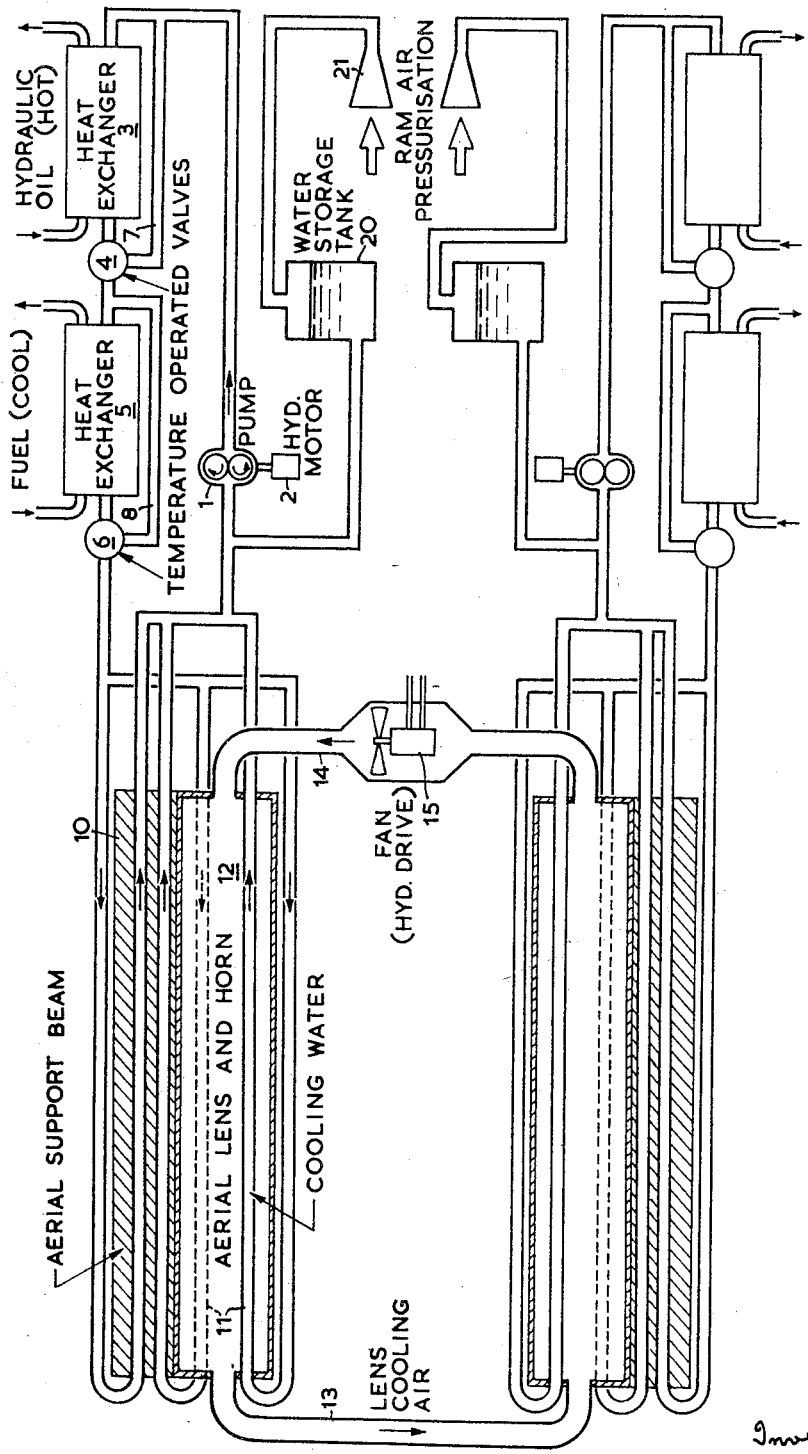

3,071,185
TEMPERATURE CONTROL SYSTEMS
FOR AIRCRAFT
Anthony Thomas Frederic Simmons, Preston, England, assignor to The English Electric Company Limited, London, England, a British company
Filed Nov. 30, 1956, Ser. No. 625,550
Claims priority, application Great Britain Dec. 9, 1955
2 Claims. (Cl. 165—22)

The present invention relates to a temperature control system for aircraft equipment, such as aerial horns, lenses and for aerial support beams for radar on board of aircraft flying at extreme speeds and altitudes where accordingly the temperature may be too high owing to aerodynamic friction and/or solar radiation, or too low owing to the high altitude.

The control system according to the invention provides accordingly for alternative heating or cooling of the circulating fluid, which may be water. In view of the fact that the boiling point of water drops very substantially at high altitudes and that evaporation and recondensation is not required and not even always desirable in temperature control systems of this kind, provision is made for pressurisation of the circulating fluid by ram air pressure.

In order that the invention may be clearly understood and readily carried into effect, an embodiment thereof will now be described by way of example with reference to the accompanying drawing which is a diagram of the temperature control system for parts of the electronic equipment of an aircraft designed to fly at extreme speed and altitude.

The greater part of the system is duplicated, and in view of its symmetrical arrangement, it will be sufficient to describe one half of the system.

The water forming the circulating fluid is forced by a gear pump 1, driven for example by a hydraulic motor 2, through two heat exchangers 3, 5 each having a temperature responsive automatic valve 4, 6 respectively, controlling by-passes 7, 8 respectively. One of the said heat exchangers, 3, has its other pass supplied by a heating medium, for example hot hydraulic oil from return line of the aircraft's hydraulic system. The other heat exchanger, 5, has its other pass supplied with comparatively cool liquid fuel for the supply of the propulsive plant of the aircraft.

From these two heat exchangers 3, 5, which may be arranged in series as shown or otherwise, the water is passed in parallel flow through the aerial support beam 10 and through ducts 11 formed in the wall of the aerial horn 12 of the radar equipment of the aircraft, and then returned to the inlet of the aforesaid pump. At this point the pipe for the water is connected to a water storage tank 20, wherein the water surface is exposed to pressurisation by ram air scooped up by a scoop 21 as indicated by the thick arrow.

The interior of the two aerial lenses and horns are connected with one another by air pipes 13, 14 forming a closed circuit in which, for example, a hydraulically driven fan 15 sets up a circulation of air, thus cooling the lens to a temperature substantially similar to that of the horn. In this particular design this air would be pressurised to about 2 p.s.i. gauge to increase heat transfer.

Owing to the provision of two heat exchangers both controlled automatically by temperature responsive valves 4, 6, one, 3, being a heater and the other, 5, a cooler, the desired temperature of the components of the electronic equipment of the aircraft can be automatically kept at the temperature required, and owing to the pressurisation by means of ram air any unintentional evaporation of the circulating fluid is prevented.

What I claim as my invention and desire to secure by Letters Patent is:

1. A temperature control system for aircraft equipment comprising in combination aircraft equipment the temperature of which is to be controlled, a circulation pump, conduits in the said equipment, a hot heat exchanger and a cold heat exchanger, by-passes to the said heat exchangers, heat-responsive automatic valves controlling the said by-passes, the said pump, conduits, heat exchangers, by-passes and valves forming a closed circuit for a heat exchanging liquid medium, a tank having an airspace and a storage space for the heat exchanging liquid medium in fluid communication with the said closed circuit, and a ram air scoop in communication with the airspace of the said tank.

2. A temperature control system as claimed in claim 1, wherein the said equipment comprises an aerial lens, a horn, a closed air circuit through the said lens and horn in heat exchange connection with the said conduits in the said equipment and a fan inserted in and driving the air through the said closed circuit, cooling the said lens to a temperature substantially similar to that of the said horn.

References Cited in the file of this patent
UNITED STATES PATENTS
1,939,689   Gebhard _____ Dec. 19, 1933
2,471,538   Oaks _____ May 31, 1949